Dec. 13, 1927.
E. PENBERTHY
1,652,637
FLUID PRESSURE TOOL
Filed April 17, 1925
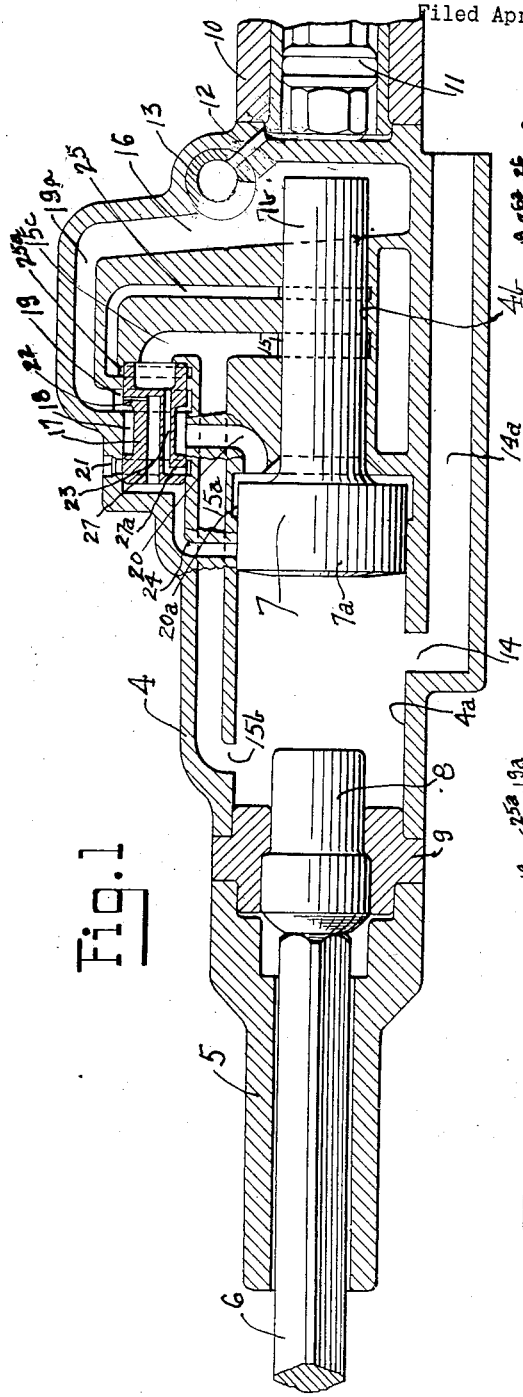
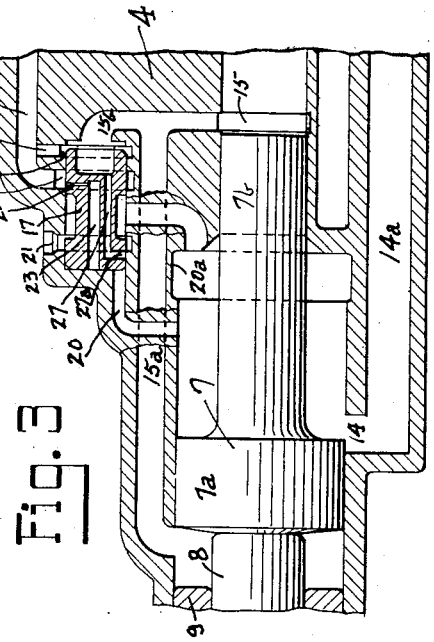
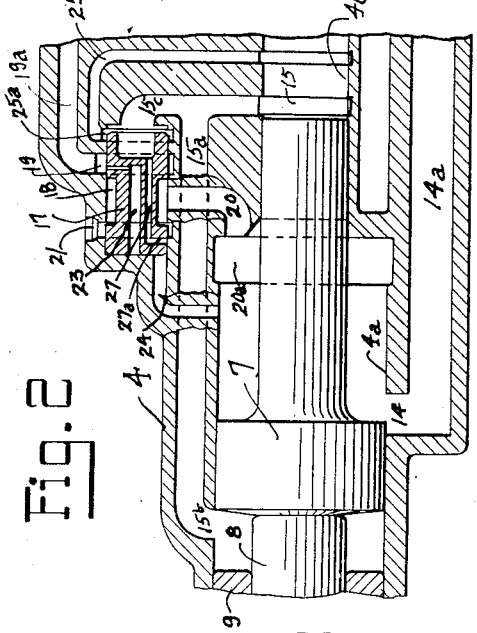
INVENTOR
Ernest Penberthy
BY his ATTORNEY
Ira L. Nickerson Patented Dec. 13, 1927.

1,652,637

UNITED STATES PATENT OFFICE.

ERNEST PENBERTHY, OF DETROIT, MICHIGAN, ASSIGNOR TO CHICAGO PNEUMATIC TOOL COMPANY, OF NEW YORK, N. Y., A CORPORATION OF NEW JERSEY.

FLUID-PRESSURE TOOL.

Application filed April 17, 1925. Serial No. 23,757.

This invention relates to fluid pressure percussive tools of the type known as hammer drills used for drilling holes in hard material such as rock in mining, quarrying, and similar operations. While it has features of utility in fluid pressure tools generally it is particularly adapted and intended for use in stoper drills having a two diameter piston and may be considered as an improvement on the invention disclosed in my co-pending application Serial No. 5,002 filed January 27th, 1925.

Practical experience and tests in drilling operations have demonstrated that the force and weight of the blow struck can be varied to advantage according to the hardness or density of the material to be drilled. For example granite, while found to be somewhat variable in hardness, is drilled with excellent results when a light weight piston driven at a very high speed is used. Limestone likewise can be drilled in an effective manner by a machine having the operating characteristics just described. For harder materials such as iron stone or phyolite porphyry, or the like, best results are obtained with a machine which strikes a heavier blow. In the case of a fluid pressure drill the weight of the blow and the number of blows per minute depend upon the specific construction of the parts and the arrangement and positioning of the motive fluid and exhaust passages, and can be varied by an appropriate change in, or modification of, said passages.

One object of the invention is to provide for changing the weight and speed characteristics of the blow delivered by a fluid pressure percussive drill with a minimum of labor and expense. Another object of the invention is to delay to any desired extent the shifting of the valve at the end of the working stroke of the piston in order that back pressure on the latter may be minimized or avoided to the end that the piston may strike a blow of maximum power. Other objects will be apparent from the detailed description which follows:

In order to illustrate the invention concrete embodiments thereof are shown in the accompanying drawings in which:

Fig. 1 is a longitudinal sectional view through a stoping drill embodying the invention.

Fig. 2 is a fragmentary view similar to Fig. 1 but showing the operative parts in a different position; and Fig. 3 is a view similar to Fig. 2 showing a modified form of drill.

Figs. 1 and 2 illustrate a fluid pressure operated tool of the hammer drill type particularly designed for stoping work and comprising a casing or cylinder 4 provided with a front head 5 to receive the shank end of the working tool or drill steel 6 which is arranged to receive the blows of the impact member or piston 7 either directly or through an anvil block 8 which may be supported in a guide member 9 interposed between the front head 5 and the cylinder 4. The rear end of the cylinder 4 has secured thereto in any known or suitable manner the usual feed cylinder 10 in which a piston 11 is arranged for sliding movement under the impulse of motive fluid which may be admitted to the feed cylinder through a passage 12 in the "on" position of the throttle valve 13.

In the present instance the impact member 7 is of the two diameter type comprising a head $7^a$ slidably fitting the large bore $4^a$ of the piston chamber and a rearwardly extending projection or stem $7^b$ of reduced diameter slidably fitting the reduced bore $4^b$ of the piston chamber. The head $7^a$ opens and closes during its reciprocation a main exhaust port 14 in cylinder 4, this exhaust port with its connecting passage $14^a$ being alternately placed in communication with the space before and behind the head $7^a$. Stem $7^b$ of the piston controls an annular port 15 from which extends a passage $15^a$ opening into the piston chamber through a port $15^b$ in advance of the forward position of the head $7^a$.

One of the pressure areas of the piston 7 for driving the same forwardly, namely the end of its stem $7^b$, is continuously subjected to motive fluid admitted to the live air chamber 16 of cylinder 4 by the throttle valve 13 when the drill is in operation. The front and rear face of piston head $7^a$ form intermittent pressure areas alternately open to the exhaust port 14, motive fluid being conducted to the forward or largest pressure area by passage $15^a$ and port $15^b$ when piston stem $7^b$ opens annular port 15 near the end of the forward stroke of the piston (Fig. 2). The supply of the motive fluid to the second intermittent pressure area, namely the rear face of head $7^a$, is controlled by an automatic valve 17 arranged for reciprocatory movement in a valve chamber 18. Valve 17 is of the spool type with end heads of equal diameter, the rearmost of which controls an annular port 19 communicating with a passage 19$^a$ leading to the live air chamber 16. When the valve is in its rearmost position (Fig. 1) port 19 is in communication with the central chamber formed by the reduced central portion of valve 17 and admits motive fluid to the passage 20 opening into an annular port 20$^a$ at the rear of the large bore 4$^a$ of the piston chamber and directly against the rear face of the head 7$^a$ of the piston. When valve 17 shifts to its forward position (Fig. 2) live air port 19 is closed and an auxiliary exhaust port 21 communicating with atmosphere is placed in communication with passage 20.

Valve 17 is shifted from its rearward position (Fig. 1) to its forward position (Fig. 2) when piston stem 7$^b$ uncovers port 15 through a branch passage 15$^c$ which admits motive fluid directly against the rear head of valve 17 which may be hollowed out or made cup shaped as shown, if desired. The shifting of the valve in the reverse direction is accomplished by a built up pressure against the other or forward head of the valve. To this end a small radial passage 22 in the rear head of valve 17 so disposed as to be always in register with the live air port 19 admits live air in limited amount to an axial bore 23 in the valve opening into the forward end of the valve chamber. From this end of the valve chamber leads a vent passage 24 which opens into the large bore 4$^a$ of the piston chamber near its rearward end. Thus the pressure fluid admitted by passages 22 and 23 to the forward end of the valve normally escapes into the piston chamber except when passage 24 is sealed by head 7$^a$ of the piston near the end of its rearward stroke (Fig. 1), at which time pressure builds up in the forward end of the valve chamber and shifts the valve to its rearward position.

To effect a full rearward stroke of the piston means are provided to continue the admission of motive fluid to the front end of the piston chamber after port 15 is closed by stem 7$^b$. Such means may take the form of a second piston controlled passage 25 intermediate port 15 and live air chamber 16 and terminating in an annular port 25$^a$ controlled by the rear head of the valve, or the means may take the form of a reduced passage 26 (Fig. 3) extending directly from live air passage 19$^a$ to an annular port 26$^a$ likewise controlled by the rear head of the valve.

The parts of the tool as heretofore described conform in all details to the invention disclosed in my aforementioned copending application, Serial No. 5,002, filed January 27, 1925, and the method of operation is in general the same. When a slower but heavier blow is desired in adapting the machine to the drilling of harder materials, the valve of the drill of my copending application above mentioned is modified in the manner now to be described. Instead of modifying the valve of my previous invention, the same may be removed and a substitute valve such as that shown in the present application may be inserted. The substitute valve, or the modified valve, constituting the essence of the present invention provides means for delaying the shifting of the valve in a forward direction and for providing an auxiliary exhaust for the front end of the piston chamber 4$^a$ so that the piston is relieved of back pressure due to air trapped therein after the piston has closed main exhaust 14 and so that the motive fluid admitted to passage 15$^a$ when piston stem 7$^b$ passes therebeyond is initially vented. The means for accomplishing the above results are by preference within the valve itself and controlled thereby and take the form of a passage 27 extending from the rear end or pressure area of the valve and terminating in a radial passage or port 27$^a$ so disposed as to register with auxiliary valve controlled exhaust port 21 when the valve is in its rearward position (Fig. 1) and to be sealed when the valve is in its forward position (Figs. 2 and 3). Thus when the valve is in its rearward position (Fig. 1) and motive fluid enters passage 15$^a$ from piston chamber 4$^b$ a slight but appreciable interval during which such motive fluid is not effective in shifting the valve and in stopping and reversing the piston occurs due to the initial venting of the same through passage 27, 27$^a$ in the valve, the duration of said interval being dependent upon the size of such passage.

A slight delay in initiating the rearward movement of the piston may result from exhaust passage 27, 27$^a$ in the valve due to the relieving of back pressure in the piston and to the initial venting of pressure fluid admitted by the piston stem to the passage 15$^a$, 15$^b$. This venting continues so long as the valve remains in the position shown in Fig. 1. With a drill striking a large number of blows per minute it is quite apparent that even a very slight delay in each stroke will produce an appreciable decrease in the number of blows struck per minute. With fewer blows per minute there is more time for the back pressure in the front of the piston to escape and consequently a more forceful blow is struck. Thus the herein described arrangement provides for a reduction in the speed of the drill, i. e. the number of strokes per minute, but the working strokes are heavier and delivered with greater force due to the minimizing or elimination of back pressure on the piston.

While the preferred embodiment herein shown discloses merely one way of practicing the invention, it is to be understood that the invention is not limited to the specific details thereof but covers all changes, modifications, and adaptations within the scope of the appended claims.

I claim as my invention:

1. In a fluid pressure percussive tool, a piston chamber having an exhaust to atmosphere intermediate its ends, a piston reciprocable in said chamber and controlling said exhaust, a valve at least partly controlling the movements of said piston, an auxiliary exhaust for one end of said piston chamber under control of said valve, said valve having a pressure area under control of said piston, and a single vent passage under control of said valve extending from said pressure area and arranged to vent both said area and the other end of said piston chamber in one position only of said valve thereby to effect a delay in the shifting of the valve and a full and forceful stroke of said piston.

2. In a fluid pressure percussive tool, a piston chamber having an exhaust to atmosphere intermediate its ends, a piston reciprocable in said chamber and controlling said exhaust, a valve at least partly controlling the movements of said piston, an auxiliary exhaust for one end of said piston chamber under control of said valve, said valve having a pressure area under control of said piston, and means including a passage in said valve for establishing connection of the other end of said piston chamber and of said pressure area with said valve controlled exhaust thereby to effect a delay in the shifting of the valve and a full and forceful stroke of said piston said means becoming inoperative as to both said area and said end of the piston chamber upon movement of said valve.

3. In a fluid pressure percussive tool, a piston chamber having a free exhaust to atmosphere intermediate its ends, a piston reciprocable in said chamber and controlling said exhaust, a valve operating in timed relation with said piston for controlling at least partly the movement of the latter, a port uncovered by the piston near the end of its working stroke to admit motive fluid from said piston chamber to a pressure area of the valve to shift the same and to the front of the piston chamber to drive the piston rearwardly, and valve controlled means for venting the front of the piston chamber and said pressure area thereby to reduce back pressure on the piston and delay the shifting of the valve.

4. In a fluid pressure percussive tool, a piston chamber having a free exhaust to atmosphere intermediate its ends, a piston reciprocable in said chamber and controlling said exhaust, a valve operating in timed relation with said piston for controlling at least partly the movement of the latter, a single passage leading both to the pressure area of the valve and to the front end of the piston chamber, a port uncovered by the piston near the end of its working stroke to admit motive fluid to said passage to shift the valve and to drive the piston rearwardly, and valve controlled means including a passage in the valve itself for venting said single passage prior to the shifting of the valve thereby to reduce back pressure on the piston and to delay the shifting of the valve.

5. In combination in a fluid pressure tool, a hammer piston having two pressure areas for driving it in one direction and an opposing pressure area for returning it, one of said first named areas being continuously subjected to pressure fluid and the other areas to intermittent pressure, said piston controlling a main exhaust port for both said intermittent areas and also a supply passage to one of said intermittent areas, a valve controlling the supply of motive fluid to the other of said intermittent pressure areas, said valve being shifted in one direction when said supply passage is uncovered by said piston, and means for initially exhausting a part of the pressure fluid admitted to said passage thereby to effect a delay in the shifting of the valve.

6. In combination in a fluid pressure tool, a hammer piston having two pressure areas for driving it in one direction and an opposing pressure area for returning it, one of said first named areas being continuously subjected to pressure fluid and the other areas to intermittent pressure, said piston controlling a main exhaust port for both said intermittent areas and also a supply passage to one of said intermittent areas, a valve controlling the supply of motive fluid to the other of said intermittent pressure areas, said valve being shifted in one direction when said supply passage is uncovered by said piston, and a vent for said passage under control of said valve for insuring a full stroke of the piston and for effecting a delay in the shifting of the valve.

7. In combination in a fluid pressure tool, a hammer piston having two pressure areas for driving it in one direction and an opposing pressure area for returning it, one of said first named areas being continuously subjected to pressure fluid and the other areas to intermittent pressure, said piston controlling a main exhaust port for both said intermittent areas and also a supply passage to one of said intermittent areas, a valve controlling the supply of motive fluid to the other of said intermittent pressure areas, said valve being shifted in one direction when said supply passage is uncovered by said piston, and means controlled by said valve including a passage in the valve itself for venting said first named passage, thereby to reduce back pressure on the piston and to delay the shifting of the valve.

8. In combination in a fluid pressure tool, a hammer piston having two pressure areas for driving it in one direction and an opposing pressure area for returning it, one of said first named areas being continuously subjected to pressure fluid and the other areas to intermittent pressure, said piston controlling a main exhaust port for both said intermittent areas and also a supply passage to one of said intermittent areas, a valve controlling the supply of motive fluid to the other of said intermittent pressure areas and an auxiliary exhaust therefor, said valve having a pressure area communicating with said supply passage thereby to effect shifting of the valve on admission of motive fluid to said passage by said piston, and a vent passage within the valve itself extending from said area and arranged to connect with said auxiliary exhaust so as to vent said supply passage and delay shifting of the valve, said vent passage being sealed on shifting of the valve.

Signed by me at Detroit, Mich., U. S. A., this 13th day of April 1925.

ERNEST PENBERTHY.